US006587697B2

(12) United States Patent
Terry et al.

(10) Patent No.: US 6,587,697 B2
(45) Date of Patent: Jul. 1, 2003

(54) COMMON CONTROL CHANNEL UPLINK POWER CONTROL FOR ADAPTIVE MODULATION AND CODING TECHNIQUES

(75) Inventors: Stephen E. Terry, Northport, NY (US); Stephen G. Dick, Nesconset, NY (US); James M. Miller, Verona, NJ (US); Eldad Zeira, Huntington, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/100,383

(22) Filed: Mar. 18, 2002

(65) Prior Publication Data

US 2002/0168994 A1 Nov. 14, 2002

Related U.S. Application Data

(60) Provisional application No. 60/290,730, filed on May 14, 2001.

(51) Int. Cl.$^7$ ................................................ H04B 7/005
(52) U.S. Cl. .......................................... 455/522; 455/69
(58) Field of Search .......................... 455/522, 69, 450, 455/67.1, 67.3, 63; 370/342, 347

(56) References Cited

U.S. PATENT DOCUMENTS

| 6,101,179 A | 8/2000 | Soliman |
| 6,108,561 A | 8/2000 | Mallinckrodt |
| 2002/0077138 A1 * | 6/2002 | Bark et al. .................. 455/522 |
| 2002/0115468 A1 * | 8/2002 | Haim ......................... 455/522 |

* cited by examiner

Primary Examiner—Nguyen T. Vo
(74) Attorney, Agent, or Firm—Volpe and Koenig, P.C.

(57) ABSTRACT

In a wireless digital communication system employing code-division multiple access (CDMA) technology, a method in which adaptive modulation and coding (AM&C) is utilized in order to achieve improved radio resource utilization and provide increased data rates for user services in which the base station measures up link interference on all time slots received from mobile terminals (UEs) and determines the need for uplink control channel; the base station transmitting to the UE the allocation of specific uplink control channels indicating uplink interference in the time slot and potentially the quality margin; the UE determining appropriate uplink power level based on a path loss determination made by the UE, uplink interference and the quality margin; the UE initiating an uplink common control transmission responsive to these determinations.

22 Claims, 5 Drawing Sheets

COMMON CONTROL CHANNEL UPLINK POWER CONTROL FOR ADAPTIVE MODULATION AND CODING TECHNIQUES

FIELD OF THE INVENTION

The present invention relates to wireless digital communication systems. More particularly, the present invention is directed to a code division multiple access (CDMA) communication system utilizing uplink power control for adaptive modulation and coding.

BACKGROUND

CDMA third generation (3G) cellular telecommunication systems apply adaptive modulation and coding (AM&C) to transmissions to achieve and improve radio resource utilization and provide increased data rates for user services. AM&C techniques take into account RF propagation conditions in advance of transmissions in order to determine modulation and coding rates that will take greatest advantage of current RF propagation conditions.

One method for determining RF propagation conditions is to perform a physical channel quality measurement at the receiver in advance of each transmission. This measurement is sent to the transmitter, which then determines the appropriate modulation and coding rate for the particular transmission based upon the physical channel quality measurement.

RF propagation conditions can change rapidly, particularly for mobile applications. Since the quality measurement of the radio interface is used to determine the appropriate modulation and coding, and since the channel quality measurement can change rapidly due to the changing RF propagation conditions, the performance of the adaptive transmission process is directly related to the time period (i.e. latency) between when a quality measurement is performed and when that transmission is initiated. Therefore, for optimal AM&C, it is necessary to perform channel quality measurements with minimal latency for all users with active data transmissions.

Physical or logical control channels are used to transfer channel quality measurements from a receiver to a transmitter. Channel quality signaling may utilize either dedicated control channels to each user equipment (UE) or common control channels shared by all UEs. When dedicated control channels are used, a continuous signaling channel is available over time for propagation of channel quality measurements for each UE. In terms of performance, this is an optimal solution for AM&C since the quality measurement is continuously available. Transmissions can occur at any time, taking into account the continuously available quality measurement for appropriate modulation and coding settings. Additionally, with a dedicated control channel always available in the uplink, the channel can be also used to support low rate uplink data transmissions.

The difficulty with the dedicated control channel approach is that physical resources are continuously allocated even when there is no data to transmit. A primary application of AM&C techniques are non-real time high data rate services, for example, Internet access. For these classes of service, the best quality of service (QoS) is achieved with short, high rate transmissions with relatively long idle periods between each transmission. These long idle periods result in an inefficient use of dedicated resources.

The problem can be minimized with pre-configured periodic dedicated channel allocations. But this results in periodic unavailability of quality measurements. If the quality measurements are not continuously available, for UEs which have transmissions at any one point in time, only some portion of the UEs will have recent channel quality measurements.

When common control channels are used, a continuous signaling channel is shared by all UEs within a cell. In Third Generation-Time Division Duplex (3G TDD) systems, the uplink common control channel typically occupies a single time slot out of multiple time slots. Procedures are defined for each UE's access to the common control channel and UE identities may be used to distinguish UE specific transactions.

To avoid contention-based access to the uplink common control channel, individual allocations are required to be signaled on the downlink common control channel. Alternatively, some mapping between the downlink allocation and uplink allocation may be defined. Each UE then accesses the uplink common control channel in accordance with its allocation. Since uplink transmissions cannot always be predicted by the network, and since uplink transmissions are infrequent, (in some applications transmitting only 5% of the time), periodic allocations of the uplink common control channel are also necessary for propagating uplink radio resource requests to support uplink user data. Additionally, when common control channels are used for AM&C operation, no inner loop power control mechanism exists for each UE, since the common control channels are not continuously available.

What is needed is an efficient method of performing power control while minimizing the overhead necessary to perform such a method. Power control will minimize the interference introduced by the uplink common control channel.

SUMMARY

The present invention determines the power level of an uplink common control channel transmission using an open loop technique, which signals information in the downlink prior to the uplink common control channel transmission in order to achieve an optimized power level. The base station allocates a specific uplink control channel indicating the uplink interference, and optionally, a quality margin for that timeslot. The UE transmits over the specific channel and determines an appropriate power level for transmission based on path loss calculated by the UE and the data received from the base station.

BRIEF DESCRIPTION OF THE DRAWING(S)

DETAILED DESCRIPTION OF THE PREFERRED EMBODIMENT(S)

Figure 1:
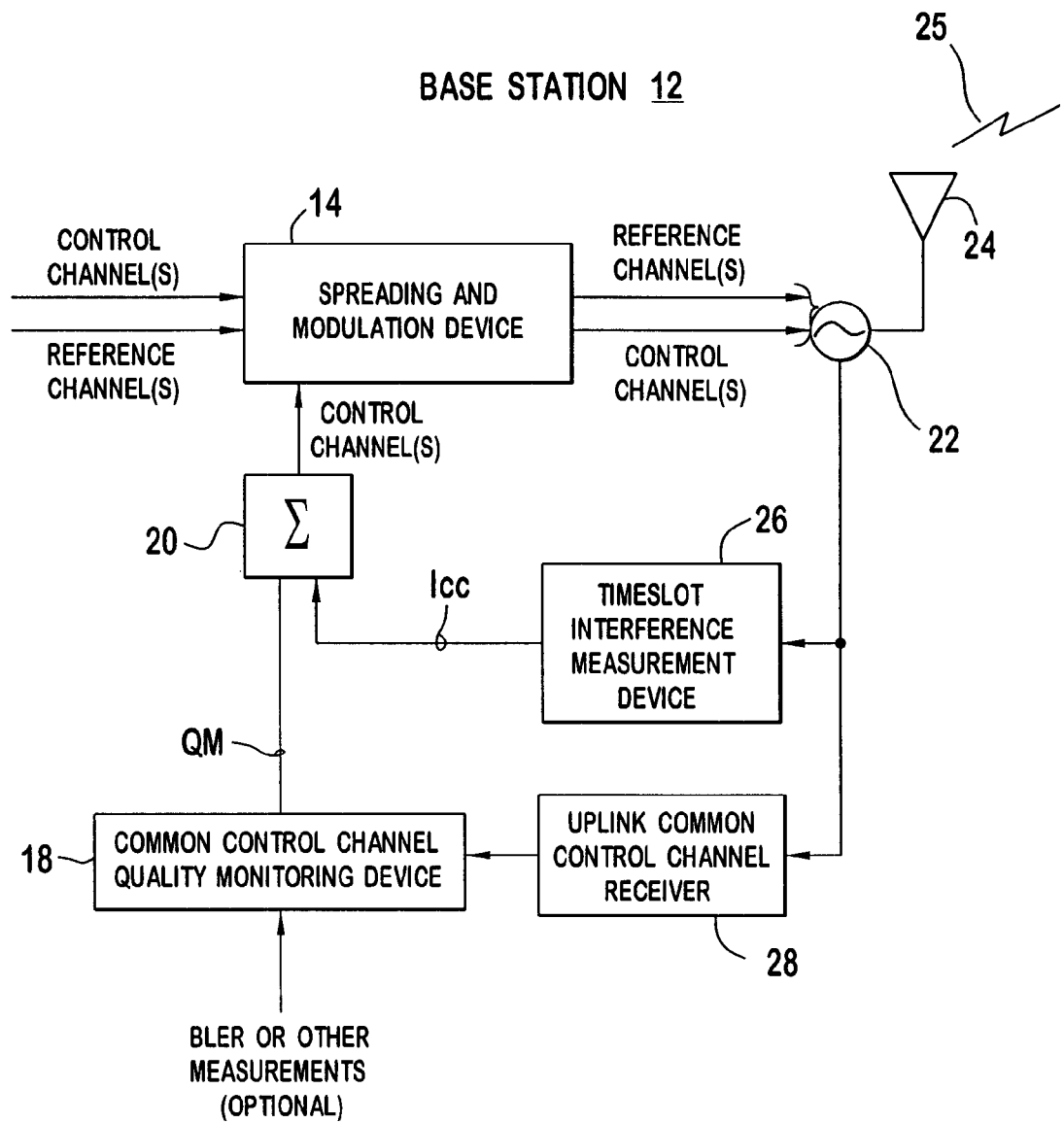
FIG. 1A is a simplified block diagram of a base station of the present invention.
FIG. 1B is a simplified block diagram of a user equipment of the present invention.
FIG. 1C is a simplified block diagram of an alternative embodiment of a base station of the present invention.

The present invention will be described with reference to the drawing figures wherein like numerals represent like elements throughout.

FIG. 1A is a simplified block diagram of a universal mobile telecommunications system terrestrial radio access network (UTRAN) base station 12, (hereinafter BS 12), which communicates wirelessly over an RF link 25 to a UE 30, (shown in FIG. 1B). The UE 30 may be a wireless cell phone, PDA or other like device which may include additional capabilities such as paging, e-mail and the like.

The BS 12 comprises an antenna 24, (or multiple antennas), an isolator/switch 22 (or like device), a time slot interference measurement device 26, an uplink common control channel receiver 28, a common control channel quality monitoring device 18, a summing device 20 and a reference downlink channel spreading and modulation device 14. The BS 12 receives communications over the radio link 25 via the antenna 24. Received signals are coupled to the interference measurement device 26 and the uplink common control channel receiver 28 through the isolator/switch 22.

The interference measurement device 26 measures time slot interference on the uplink common control channel. For example, the interference measurement device 26 may measure interference signal code power (ISCP). The interference measurement device 26 provides an output (Icc), which is an indicator of the amount of interference on the uplink common control channel.

The receiver 28, which may be a matched filter, RAKE or like device, receives and applies the signal in the uplink common control channel to the channel quality (CQ) measuring device 18 for monitoring the channel control (CQ) of the uplink common control channel and providing a quality margin (QM) for a given UE.

The QM can be signaled, for example, as a calculated Signal to Interference Ratio target ($SIR_{target}$) that the UE transmissions are expected to achieve. The QM can also be based upon a combination of factors including the $SIR_{target}$, RF propogation conditions and/or the QoS requirements for the service desired by the UE. In turn, the $SIR_{target}$ may be based upon measurements from previous transmission from the particular UE, such as the block error rate (BLER). Unlike the uplink interference level, the QM is not required for each individual uplink common control allocation and can, as one option, be separately specified by the BS 12 or even eliminated, as shown in FIG. 1C.

Referring back to 1A, when not specified by the BS 12 or when not constantly updated by the UE 30, the QM may be stored and the most recent QM is used.

The Icc and QM values are applied to first and second inputs of the summing device 20. The output of the summing device 20 is input to the spreading modulation device 14.

Although, the QM and the Icc may be combined by the summing device 20 as shown, they may also be encoded into a single parameter, further reducing downlink signaling overhead. As further alternative, the Icc may be signaled separately, for example, on a broadcast channel. In that case, only the QM will need to be signaled. The Icc and QM, if not combined or encoded into a single parameter, may be separately input into the spreading and modulation device 14 and sent over separate downlink channels. The output from the spreading and modulation device 14 is passed to the antenna 24 through the isolator/switch 22 for transmission to the UE 30. The QM and Icc are signaled over one or more downlink control channels. The path loss measurement, (which is performed by the UE 30 as will be explained in further detail hereinafter), is performed on the reference channel.

Figure 1B:
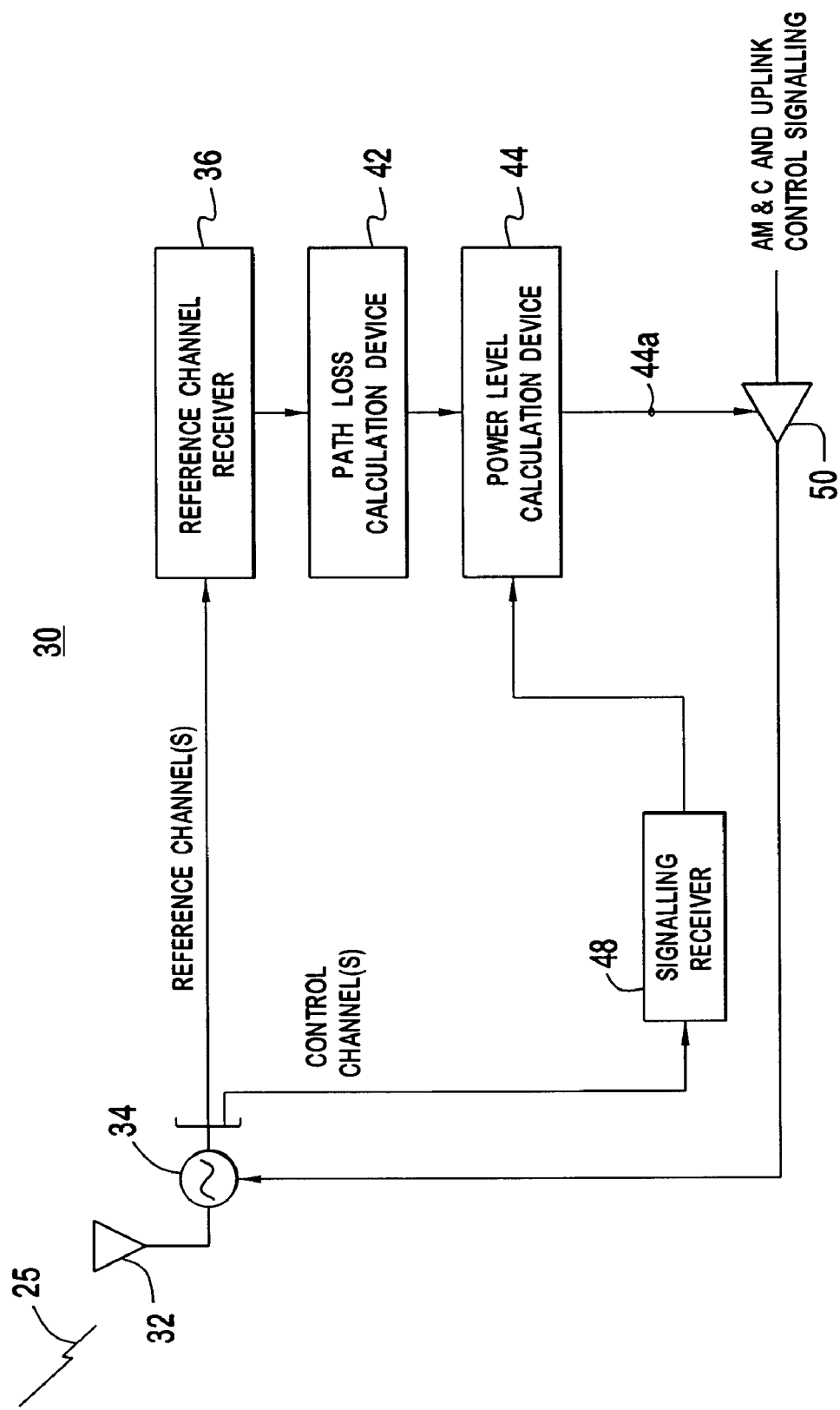
Figure 1C:
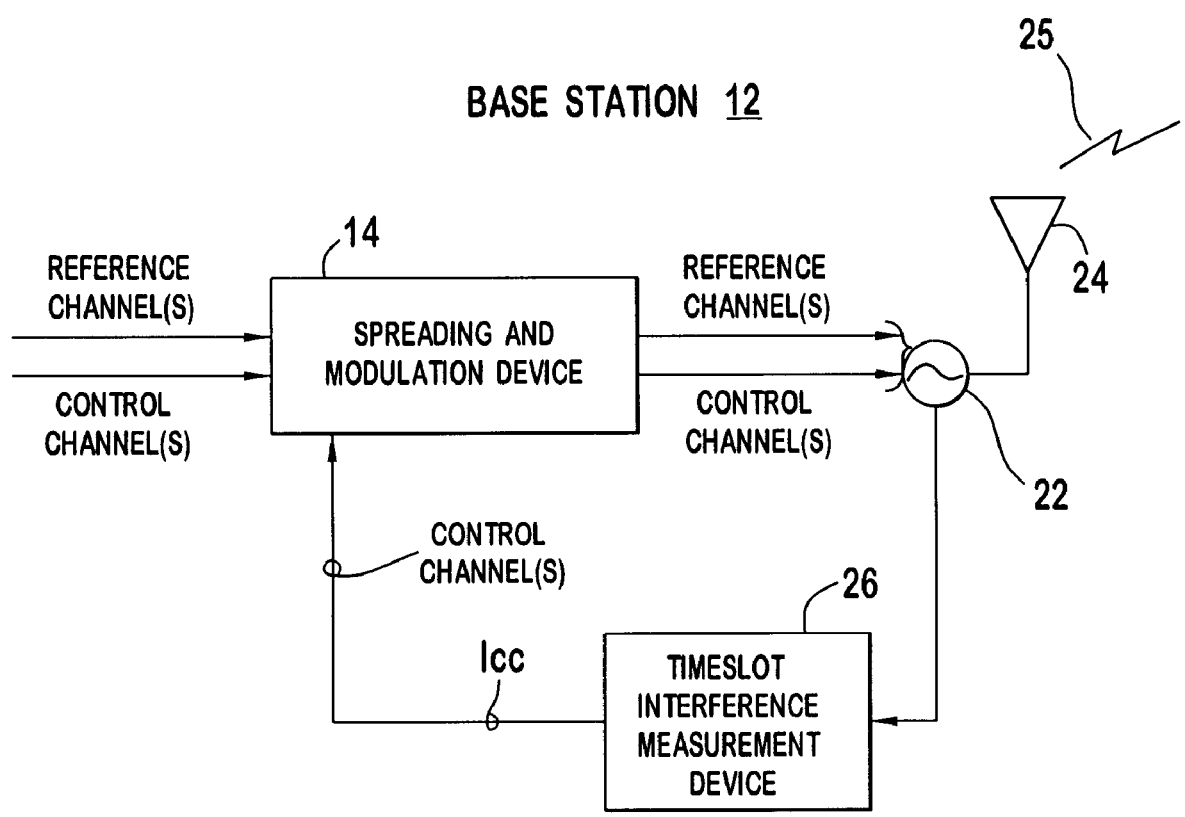

As shown, FIGS. 1A–1C refer to reference channels (and control channel(s)). It should be noted that the present invention comprises only a portion of the signaling that is performed between the base 12 and the UE 30. It is not central to the present invention whether the measurements described herein are sent over a single reference channel, a single control channel or multiple reference and/or control channels. It is contemplated that a combination of reference and/or control channels may be used within the spirit and scope of the present invention.

Referring to FIG. 1B, the UE 30 comprises an antenna 32, an isolator/switch 34, a reference channel receiver 36, a path loss calculation device 42, power level calculation device 44, an adaptive modulation and coding controller 46, a signaling receiver 48, a power amplifier 50. The antenna 32 receives communications from the BS 12 over the RF link 25 and applies the communications through the isolation/switch 34, as appropriate to either the reference channel receiver 36 (i.e., the reference channel(s)), or the signaling receiver 48 (i.e., the control channel(s)).

The reference channel receiver 36, receives and processes one or more reference channels in a manner that is well known to those of skill in the art. Accordingly, such detail will not be included herein. The reference channel receiver 36 performs an estimate of the reference channel for data detection and provides the power level of the received signal to the path loss calculation device 42. The path loss calculation device 42 employs the power level to determine power loss in the downlink transmission.

The QM and Icc information transmitted by the BS 12 are received by the signaling receiver 48, which passes this information to the power level calculation device 44. The power level calculation device 44 uses the outputs of the path loss calculation device 42 and the signaling receiver 48 to determine a proper power level for transmission to BS 12 as a function of path loss and interference in the RF link 25.

The output 44a of the power level calculation device 44 regulates the output power of the UE 10 via control of the power amplifier 50. The power amplifier 50 amplifies, as appropriate.

The output of the amplifier 50 is transmitted to the BS 12 through the isolator/switch 34 and the antenna 32.

As those of skill in the art would understand, TDD utilizes a transmission structure whereby a frame is repetitively transmitted, each frame comprising a plurality of time slots. Data to be transmitted is segmented, and the segmented data is then scheduled for transmission in one or more time slots. For TDD, the CQ interference measurement from the same slot in a previous frame is very valuable in determining the modulation and coding rate of the current frame. As will be described in greater detail hereinafter, the CQ interference measurement as measured at the base station is signaled in the downlink in advance of the common control uplink transmission.

Figure 2:
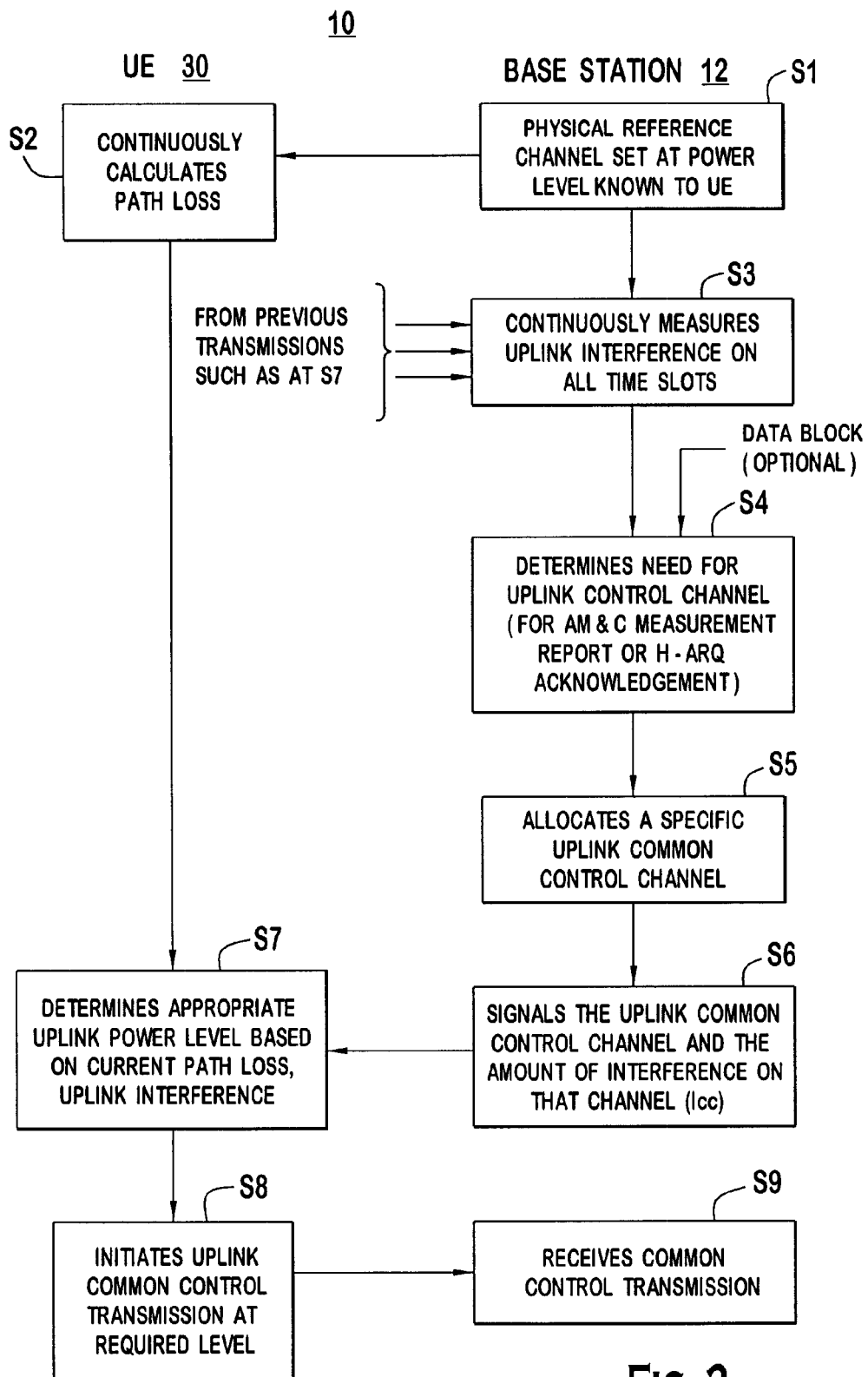
FIG. 2 is a simplified block diagram illustrating one preferred embodiment of the process of the common control channel uplink power control of the present invention.

One embodiment of the method 10 of the present invention is shown in the flow diagram of FIG. 2. In this method, the BS 12, at step S1, the reference channel is transmitted, with a power level known to the UE 30. The UE 30 continuously calculates path loss at step S2. The BS 12 continuously measures uplink interference on all time slots, at step S3, based on transmissions from the UEs, (only one UE 30 being shown in FIG. 2 for simplicity); and can also be based upon transmission from other base stations, (only one BS 12 shown for simplicity).

The BS 12, at step S4, determines the need for an uplink common control channel; for example 1) an AM&C measurement report; or 2) Hybrid-Automatic Repeat Request (H-ARQ) control information. This determination may optionally be in response to the receipt of a data block. At step S5, the BS 12 allocates a specific uplink common control channel, indicating the uplink interference level Icc in that time slot. The BS 12 at step S6 signals the uplink common control channel to be utilized and the uplink interference level (Icc) for the allocated channel. These parameters are signaled over a downlink control channel. Note that the parameters of the specific uplink control channel may be implicitly known.

The UE 30, at step S7, determines the appropriate uplink power level for transmission to the BS 12 based upon the current path loss measured by the UE 30 at step S2 and the interference level Icc obtained from the BS 12.

Figure 3:
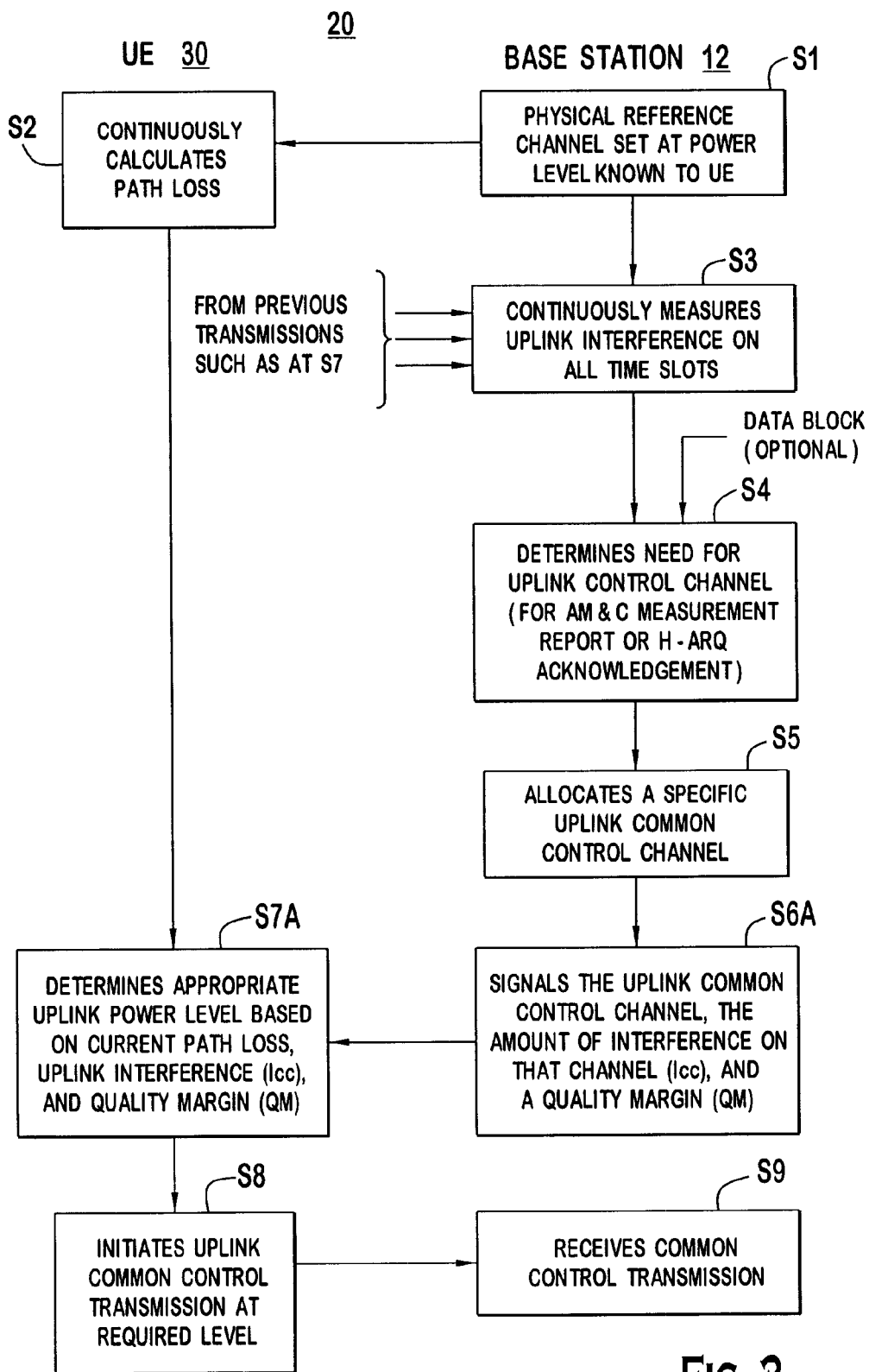
FIG. 3 is a flow diagram showing an alternative embodiment of the present invention.

As stated hereinbefore, in an alternative embodiment the QM may also be signaled along with, or separate from, the interference level Icc. This alternative embodiment of the method 20 of the present invention is shown in FIG. 3, providing further optimization of the uplink common control channel power level. Those steps in FIG. 3 that are numbered the same as FIG. 2 implement the same steps of the procedure. However, further optimization is achieved by additionally signaling a requested QM with the uplink common control channel allocation. The QM is based, among other aspects, upon previous transmissions from the particular UE received at step S3. FIG. 3 shows step S6 modified as step S6A and step S7 modified as step S7A. As shown in both FIGS. 2 and 3, the BS 12 may perform step S4 in response to receiving a data block; or may be independent of whether or not a data block is received.

Referring back to FIG. 2, the transmit power level of a UE (Tue) may be represented by the following equation:

$$T_{UE}=PL+QM+Icc \qquad \text{Equation (1)}$$

where PL is the path loss; and Icc is the interference level for an uplink common control channel communication. The path loss (PL) may be calculated as follows:

$$PL=T_{REF}-R_{UE} \qquad \text{Equation (2)}$$

where $T_{REF}$ is the power of the reference signal at the BS 12 and $R_{UE}$ is the received power at the UE 30 of the reference signal.

The UE 30 at step S8, initiates an uplink common control transmission at the uplink transmit power level calculated using Equations 1 and 2; the transmission being received by the BS 12, at step S9.

When the QM is transmitted from the BS 12 to the UE 30 as shown in the alternative method 20 of FIG. 3, the transmit power level of a UE ($T_{UE}$) may be represented by the following equation:

$$T_{UE}=PL+QM+Icc \qquad \text{Equation (3)}$$

where PL is the path loss; QM is the desired quality margin and Icc is the interference level for the uplink common control channel communication. The path loss (PL) may be calculated as follows:

$$PL=T_{REF}-R_{UE} \qquad \text{Equation (4)}$$

Where $T_{REF}$ is the power of the reference signal at the BS 12 and $R_{UE}$ is the received power of the reference signal at the UE.

The present invention has several advantages over prior art methods. The measured uplink interference level can be specified in the allocation message, assuring a very low latency uplink interference measurement is available to the UE. Alternatively, the measured uplink interference level can be provided via the downlink common control channel or other means. Since the AM&C uplink control channel is expected to exist in a single 3G TDD mode timeslot, still further efficiencies are perceived. Normally, in slotted systems employing similar open loop power control mechanisms, interference must be reported for each slot for proper operation. Since only one slot is used for the uplink common control channel and therefore only the uplink interference for one slot has to be signaled, minimal overhead is introduced to the downlink allocation signaling for the benefit of more efficient use of uplink radio resources.

While the present invention has been described in terms of the preferred embodiment, other variations which are within the scope of the invention as outlined in the claims below will be apparent to those skilled in the art.

What is claimed is:

1. A method for determining uplink power level in a wireless digital communication system comprising a base station and at least one user equipment (UE), comprising the steps of:

(a) said base station transmitting a signal over a physical reference channel to the UE;

(b) said UE calculating a path loss, responsive to the transmission over the physical reference channel, a power setting of which is known to the UE;

(c) said base station, responsive to an uplink transmission from the UE, measuring uplink interference level for time slots in which the UE transmits;

(d) said base station, allocating a specific uplink control channel indicating uplink interference level in the channel, said allocation and indication being transmitted to the UE;

(e) said UE determining an uplink power level based on current path loss calculated by the UE and said indication; and (f) initiating an uplink control channel transmission to the base station having the power level determined at step (e).

2. The method of claim 1 wherein step (d) is initiated responsive to receipt of a data packet which includes data for transmission to the UE.

3. The method of claim 1 step (d) includes generating at the base station and transmitting to the UE a quality margin.

4. The method of claim 3 wherein step (e) further includes using said quality margin to determine said uplink power level.

5. The method of claim 4 wherein the quality margin transmitted by said base station includes a signal to interference ratio (SIR) target that the UE transmission to the base station is expected to achieve.

6. The method of claim 4 wherein the quality margin and interference level are encoded into a single parameter for transmission at step (d).

7. The method of claim 3 wherein a quality margin of a previous transmission from the base station is used by the UE at step (e) if a quality margin is omitted from a present transmission of the base station at step (d).

8. The method of claim 1 wherein step (d) further includes transmitting a quality margin to the UE for use in determining the uplink power level.

9. A method for employing an open loop technique for determining uplink power level in a wireless digital communication system comprising of a base station and a plurality of user equipment (UEs), comprising the steps of:

(a) said base station transmitting a signal over a physical reference channel to the UEs;

(b) said UEs calculating an expected path loss responsive to the transmission over the physical reference channel, the power setting of which is known to the UEs;

(c) said base station, responsive to uplink transmissions from said UEs, measuring the uplink interference level for time slots in which the UEs transmit;

(d) said base station, responsive to a data packet containing data for certain ones of said UEs, transmitting a request to the last-mentioned UEs to perform a power level calculation;

(e) said last-mentioned UEs receiving a request transmitted during step (d) determining an uplink power level based on path loss calculated at step (b) by the last-mentioned UEs and data received from the base station; and (f) said last-mentioned UEs initiating an uplink transmission to the base station at a power level determined at step (e).

10. A method for employing an open loop technique for determining uplink power level in a wireless digital communication system comprised of a base station and at least one mobile terminal (UE), comprising the steps of:

(a) said base station transmitting a signal over a physical reference channel to the UE;

(b) said UE calculating a path loss, responsive to the physical reference channel transmission, a power setting of which is known to the UE;

(c) said UE, generating an uplink transmission in one or more timeslots to said base station;

(d) said base station, responsive to said uplink transmission, measuring uplink interference for time slots in which the UE transmits;

(e) said base station, allocating a specific uplink control channel indicating uplink interference in the slot, which is transmitted to the UE, together with additional data;

(f) said UE determining an uplink power level based on current path loss calculated by the UE and said uplink interference; and (g) said UE initiating an uplink control channel transmission to the base station having the power level determined at step (f).

11. The method of claim 10 wherein step (d) is initiated responsive to receipt of a data packet which includes data for transmission to the UE.

12. The method of claim 10 wherein step (e) includes generating at the base station and transmitting to the UE a quality margin for use in determining the uplink power level for the UE at step (f).

13. The method of claim 12 wherein the quality margin includes a signal to interference ratio (SIR) target that the UE transmission is expected to achieve.

14. The method of claim 12 wherein a quality margin of a previous transmission from the base station is used by the UE at step (f) if a quality margin is omitted from a present transmission of the base station at step (e).

15. The method of claim 12 wherein quality margin and uplink interference are encoded into a single parameter for transmission at step (e).

16. A method for power control between a base station and a user equipment (UE), comprising:

(a) said base station transmitting a signal;

(b) said UE receiving said signal and calculating the path loss;

(c) said base station measuring uplink interference of any UE transmission;

(d) said base station, allocating a specific uplink control channel and transmitting said allocation to the UE including an uplink interference level in the channel;

(e) said UE determining an uplink power level based on said path loss and said interference level; and (f) said UE initiating and uplink control channel transmission to the base station having the power level determined at step (e).

17. The method of claim 16 wherein step (d) is initiated in response to receipt of a data packet which includes data for transmission to the UE.

18. A method for determining an uplink power level in a user equipment (UE), comprising the steps of:

(a) receiving a signal over physical reference channel;

(b) responsive to the receipt of the signal, calculating an expected path loss;

(c) receiving an allocation of specific uplink control channel including the amount of interference in the channel;

(d) determining an uplink power level based on said path loss and said interference level; and (e) initiating an uplink control channel transmission having the power level determined at step (d).

19. A method for determining uplink power level by a user equipment (UE), comprising:

(a) receiving a first signal;

(b) calculating the path loss of the first signal, the transmission power of which is known;

(c) receiving an allocation of a specific uplink control channel;

(d) receiving a second signal indicating the interference level in the allocated channel;

(e) determining an uplink power level based on said path loss and said interference level; and (f) transmitting on said uplink control channel at the power level determined at step (e).

20. A method for determining uplink power level comprising the steps of:

(a) receiving a signal;

(b) calculating path loss from said signal;

(c) receiving the allocation of an uplink control channel including an indication of the interference on the channel;

(d) determining the uplink power level based on both path loss and interference level; and (e) transmitting on the uplink control channel at the power level determined at step (d).

21. A method for determining uplink power level comprising the steps of:

(a) receiving a signal;

(b) calculating path loss from said signal;

(c) receiving the allocation of an uplink control channel including an indication of the interference on the channel and quality margin;

(d) determining the uplink power level based on said path loss, said interference level and said quality margin; and (e) transmitting on the uplink control channel at the power level determined at step (d).

22. The method of claim 21, whereby said interference level and said quality margin are encoded into a single parameter, and step (d) further includes decoding said parameter.

* * * * *

UNITED STATES PATENT AND TRADEMARK OFFICE
CERTIFICATE OF CORRECTION

PATENT NO. : 6,587,697 B2
DATED : July 1, 2003
INVENTOR(S) : Terry et al.

It is certified that error appears in the above-identified patent and that said Letters Patent is hereby corrected as shown below:

Column 7,
Line 30, delete "claim 1" and insert therefor -- claim 17 --.

Signed and Sealed this

Nineteenth Day of October, 2004

JON W. DUDAS
*Director of the United States Patent and Trademark Office*